(12) United States Patent
Sakairi et al.

(10) Patent No.: US 7,196,873 B2
(45) Date of Patent: Mar. 27, 2007

(54) DISK DEVICE AND SLIDER

(75) Inventors: Makoto Sakairi, Kawasaki (JP); Masaki Kameyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 357 days.

(21) Appl. No.: 10/976,308

(22) Filed: Oct. 29, 2004

(65) Prior Publication Data

US 2005/0275970 A1    Dec. 15, 2005

(30) Foreign Application Priority Data

Jun. 11, 2004 (JP) ............... 2004-174280

(51) Int. Cl.
*G11B 5/60* (2006.01)
(52) U.S. Cl. .................. 360/235.8
(58) Field of Classification Search ........... 360/235.4, 360/235.5, 235.7, 235.8, 235.9, 236.3, 236.5, 360/236.6, 236.7, 237
See application file for complete search history.

(56) References Cited

U.S. PATENT DOCUMENTS

| 6,590,746 B2 | 7/2003 | Kang et al. ............ 360/236.3 |
| 6,646,831 B1 * | 11/2003 | Takagi et al. ............ 360/234.3 |
| 6,646,832 B2 * | 11/2003 | Anaya-Dufresne et al. ............ 360/236.2 |
| 6,728,069 B2 * | 4/2004 | Otsuka et al. ............ 360/235.8 |
| 6,771,468 B1 * | 8/2004 | Levi et al. ............ 360/235.5 |
| 7,019,945 B1 * | 3/2006 | Peng et al. ............ 360/235.7 |
| 7,116,521 B2 * | 10/2006 | Kameyama ............ 360/235.1 |

FOREIGN PATENT DOCUMENTS

| JP | 2002-32905 | 1/2002 |
| JP | 2002-109710 | 4/2002 |

\* cited by examiner

*Primary Examiner*—Angel Castro
(74) *Attorney, Agent, or Firm*—Armstrong, Kratz, Quintos, Hanson & Brooks, LLP

(57) ABSTRACT

A disk device rotates a disk-like storage medium, and accesses the storage medium, and a slider floats over a storage medium by the action of an airflow caused by rotation of the storage medium and can float stably despite of an environmental change. An inner rail formed on a floating surface of the slider has a first step part located on an air inlet side and a second step part located adjacent to the first step part on the air outlet side and having a height greater than that of the first step part, and the first step part and the second step part are separated by a wall along a first segment extending from an inner side toward an outer side and a second segment extending from the outer-side end of the first segment toward the outer side with being slanted toward the air inlet side.

12 Claims, 11 Drawing Sheets

(Inlet side)　　　　　　　(Outlet side)

DISK DEVICE AND SLIDER

BACKGROUND OF THE INVENTION

1. Field of the Invention

The present invention relates to a disk device that rotates a disk-like storage medium (for example, a magnetic disk) and accesses the rotating storage medium, and a slider that floats over the storage medium by the action of the airflow caused by the rotation of the storage medium.

2. Description of the Related Art

Conventionally, many types of magnetic disk devices including built-in type ones and external type ones have been used with computers. In recent years, magnetic disk devices have become incorporated not only in computers in a narrow sense but also in video devices, digital cameras, car navigation systems and the like.

Such magnetic disk devices can be generally categorized into the contact start stop (CSS) method and the load/unload method. According to the CSS method, when the magnetic disk stops rotating, the magnetic head slider holding the magnetic head for accessing the magnetic disk remains on the magnetic disk. According to the CSS method, when the magnetic disk starts rotating, the airflow caused by the rotation makes the magnetic head slider float slightly over the magnetic disk surface, and the magnetic head accesses the magnetic disk in this state.

On the other hand, according to the load/unload method, when the magnetic disk stops rotating, the magnetic head slider is moved to a waiting position outside the circumference of the magnetic disk (this movement is referred to as "unloading"), and once the magnetic disk starts rotating, the magnetic head slider is moved to a position over the magnetic head (this movement is referred to as "loading").

With the recent increase of the recording density of the magnetic disk, preventing the magnetic head slider from coming into contact with the magnetic disk to stably make the slider float slightly over the disk has become one of significant objectives. To this end, various techniques have been proposed (for example, see the Patent Documents 1 and 2).

[Patent Document 1] Japanese Patent Laid-Open No. 2002-32905

[Patent Document 2] Japanese Patent Laid-Open No. 2002-109710

SUMMARY OF THE INVENTION

In order to allow a magnetic head slider to float at a low height, the magnetic head slider has to float stably even when a magnetic disk is rotating at a low speed, even under a high altitude environment in which the air pressure is low, or the like. However, conventional techniques have a problem that, when the magnetic disk is rotating at a low speed, the roll angle increases, the magnetic head slider is inclined, and thus, the posture of the rotating magnetic head slider is unstable, and a problem that, under a high altitude environment, the pitch on the air inlet side of the magnetic head slider is lowered, so that the magnetic head slider is likely to come into contact with the magnetic disk, for example. In order to allow a magnetic head slider to float at a lower height, such problems have to be solved.

The present invention has been made in view of the above circumstances and provides a slider that floats stably despite of an environmental change or the like, and a disk device having such a slider.

The present invention provides a disk device that rotates a disk-like storage medium and accesses the storage medium, having:

a slider that has an element for accessing the storage medium fixed thereto, floats over the storage medium by the action of an airflow caused by rotation of the storage medium and allows the element to access the storage medium, in which the slider has a floating surface facing the storage medium and having a first projection located on an air inlet side and a second projection located on an air outlet side, the second projection on the air outlet side being divided into an inner projection located close to a rotation center of the storage medium, an outer rail located far from the rotation center of the storage medium, and an intermediate projection having the element fixed thereto and located between the inner projection and the outer projection, and the inner projection has a first step part located on the air inlet side and a second step part located adjacent to the first step part on the air outlet side and having a height greater than that of the first step part, the first step part and the second step part being separated by a wall along a first segment extending from the inner side toward the outer side and a second segment extending from the outer-side end of the first segment toward the outer side with being slanted toward the air inlet side.

If the first step part and the second step part are separated by the wall along the first segment and the second segment, as shown by the simulation results described later, the variation in roll angle between a normal rotation period and a low-speed rotation period can be reduced.

In the disk device according to the present invention described above, it is preferred that the first projection has a first step part located on the air inlet side and a second step part located adjacent to the first step part on the air outlet side and having a height greater than that of the first step part, and the first step part and the second step part are separated by a wall along a boundary line connecting the inner side and the outer side and having an inner section, an outer section and an intermediate section between the inner section and the outer section that is located closer to the air inlet side than the inner section and the outer section.

If the first step part on the air inlet side of the first projection and the second step part adjacent to the first step part are separated by the wall along the boundary line having the intermediate section closer to the air inlet side than the other sections, as shown by the simulation results described later, the reduction of the pitch angle on the air inlet side under the high altitude environment can be suppressed, and thus, the floating pitch angle during the normal rotation period can be reduced.

In addition, in the disk device according to the present invention described above, it is preferred that the first projection has three rails including an inner rail, an outer rail and an intermediate rail between the inner rail and the outer rail, which are located on the air outlet side of the second step part of the first projection and extend toward the air outlet side.

In addition, in the disk device according to the present invention described above, the storage medium may typically be a magnetic disk, and the slider may typically be a CSS-type slider, which is in contact with the storage medium when the storage medium is at rest.

Furthermore, the present invention provides a slider that has an element for accessing a rotating disk-like storage medium fixed thereto, floats over the storage medium by the action of an airflow caused by rotation of the storage medium and allows the element to access the storage medium, in which the slider has a floating surface facing the storage medium and having a first projection located on an air inlet side and a second projection located on an air outlet side, the second projection on the air outlet side being divided into an inner projection located close to a rotation center of the storage medium, an outer rail located far from the rotation center of the storage medium, and an intermediate projection having the element fixed thereto and located between the inner projection and the outer projection, and the inner projection has a first step part located on the air inlet side and a second step part located adjacent to the first step part on the air outlet side and having a height greater than that of the first step part, the first step part and the second step part being separated by a wall along a first segment extending from the inner side toward the outer side and a second segment extending from the outer-side end of the first segment toward the outer side with being slanted toward the air inlet side.

The slider according to the present invention has various modifications corresponding to those of the slider of the disk device according to the present invention.

As described above, according to the present invention, the slider can float stably over the storage medium, and thus, it is possible to make the slider float at a lower height.

DETAILED DESCRIPTION OF THE INVENTION

In the following, embodiments of the present invention will be described.

Figure 1:
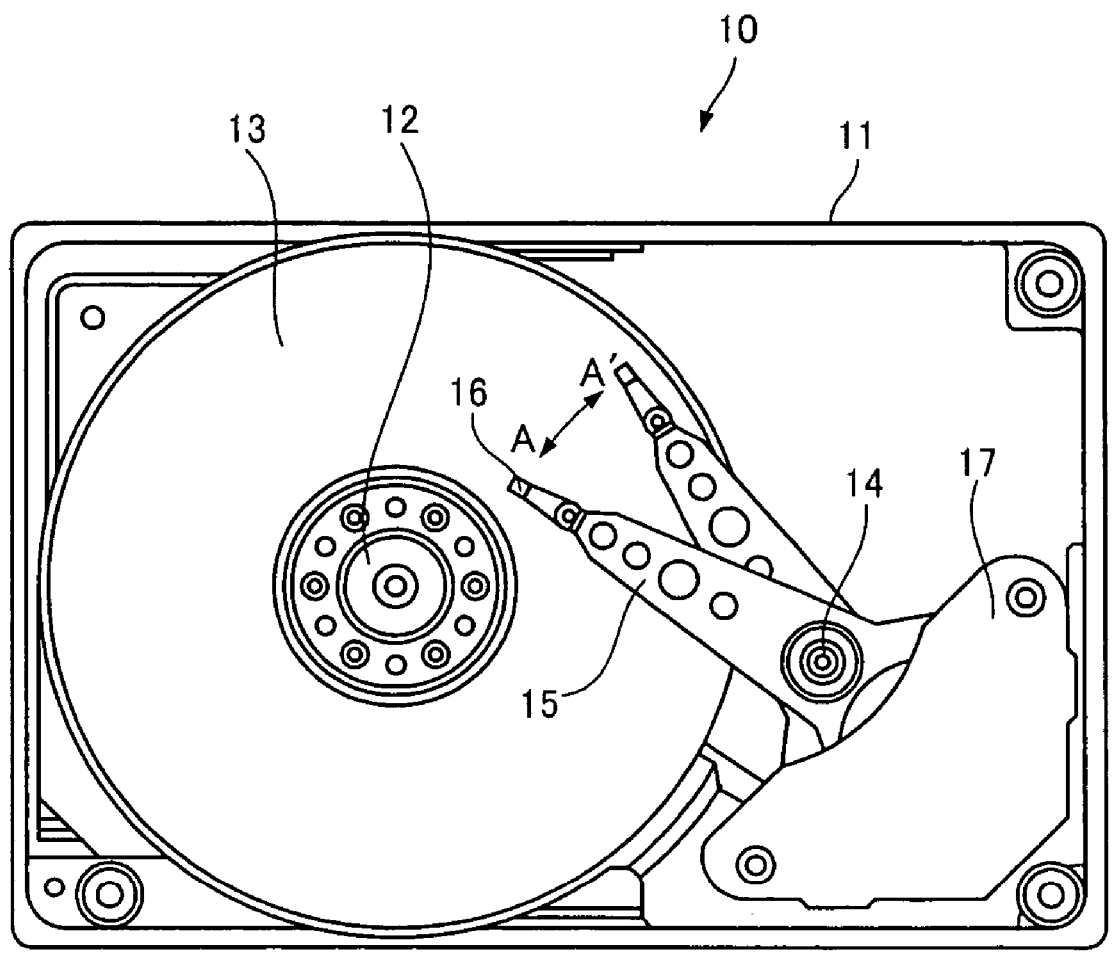
FIG. 1 is a schematic diagram showing a magnetic disk device according to an embodiment of the present invention.

FIG. 1 is a schematic diagram showing a magnetic disk device according to an embodiment of the present invention.

A magnetic disk device 10 has a housing 11, which houses a rotation shaft 12, a magnetic disk 13 attached to the rotation shaft 12, an oscillation shaft 14, a carriage arm 15 that oscillates about the oscillation shaft 14, a magnetic head slider 16 attached to a tip of the carriage arm, and an actuator 17 that makes the carriage arm 15 oscillate. To access (read/write) the magnetic disk 13, the actuator 17, which is constituted by a magnetic circuit, makes the carriage arm 15 oscillate in the direction A–A', thereby positioning a magnetic head (not shown in FIG. 1) on the magnetic head slider 16 at a desired track on the rotating magnetic disk 13, and the magnetic head accesses the magnetic disk 13. When the magnetic disk 13 is at rest (that is, not rotating), the magnetic head slider 16 is at rest in contact with a predetermined CSS zone on the magnetic disk 13. The interior space of the housing 11 is closed by a cover (not shown).

In the following, an arrangement of the magnetic head slider 16 attached to the tip of the carriage arm 15 will be described. However, an arrangement of a conventional magnetic head slider will be first described, and then, the arrangement of the magnetic head slider according to this embodiment will be described.

Figure 2:
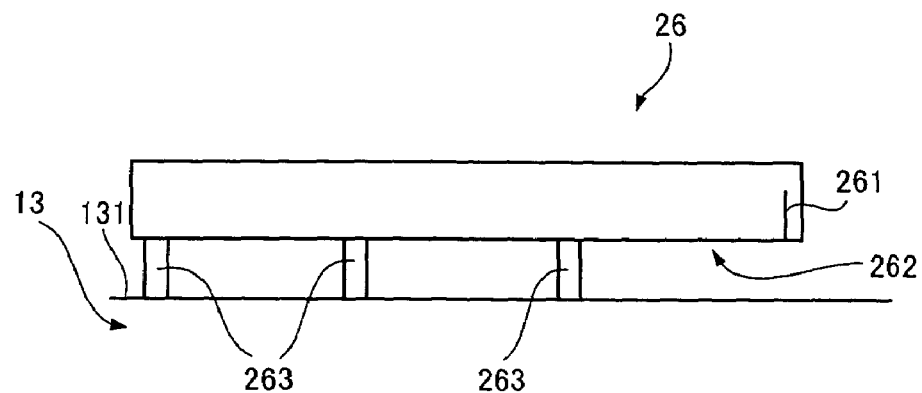
FIGS. 2 (A) and (B) show a conventional magnetic head slider.
Figure 2:
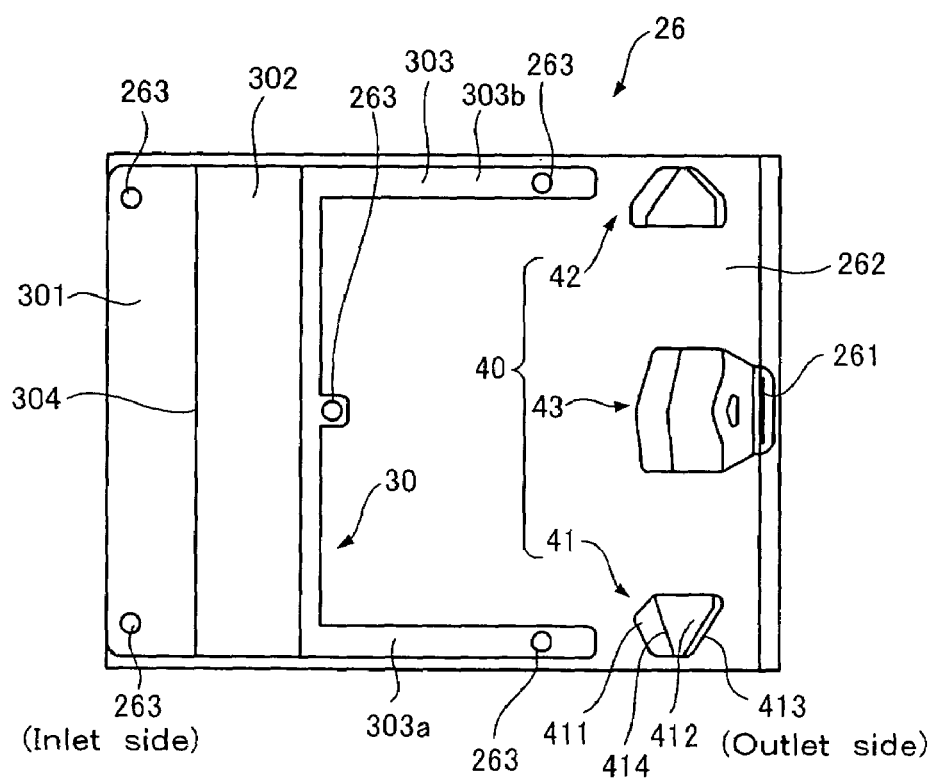

FIGS. 2 (A) and (B) show a conventional magnetic head slider. FIG. 2(A) is a side view thereof, and FIG. 2(B) shows a floating surface thereof facing a magnetic disk.

A magnetic head slider 26 has a magnetic head (electromagnetic transducer element) 261 on an air outlet side. In a state where the magnetic head slider 26 floats over a surface 131 of the magnetic disk 13 (see FIG. 3), the magnetic head 261 on the magnetic head slider 26 electromagnetically accesses (reads/writes) the magnetic disk 13.

A floating surface 262 of the magnetic head slider 26 facing the magnetic disk 13 has a protrusion 263 extending toward the magnetic disk 13. When the magnetic disk 13 is at rest, only the protrusion 263 is in contact with the surface 131 of the magnetic disk 13, preventing the magnetic head slider 26 from being adsorbed to the magnetic disk 13 and facilitating lifting of the magnetic head slider 26 at the start of rotation of the magnetic disk 13.

As shown in FIG. 2(B), the floating surface 262 of the magnetic head slider 26 has a first projection 30 including the protrusion formed on an air inlet side and second projections 40 formed on the air outlet side. The second projections 40 are separate ones including an inner projection 41 formed on the inner side close to the rotation center of the magnetic disk 13, an outer projection 42 formed on the outer side far from the rotation center of the magnetic disk 13, and an intermediate projection 43 located between the inner projection 41 and the outer projection 42 to which the magnetic head (electromagnetic transducer element) 261 is fixed.

A first step part 301 of the first projection 30 on the air inlet side has a certain height from a base portion of the floating surface 262, and a second step part 302 adjacent to the first step part 301 on the air outlet side has a height greater than that of the first step part 301. Furthermore, a third step 303 adjacent to the second step part 302 on the air outlet side has the same height as the first step part 301 and has plural rails 303a, 303b extending toward the air outlet side.

The first step part 301 and the second step part 302 of the first projection located on the air inlet side are separated by a wall along a straight boundary line 304 connecting the inner side and the outer side.

The inner projection 41 of the second projections 40 has a first step part 411 having a certain height from the base portion of the floating surface 262, a second step part 412 having a height greater than that of the first step part 411 and a third step 413 having a height still greater than that of the second step part 412, in order of increasing distance from the air inlet side. The outer projection 42 has the same configuration, and the intermediate projection 43 has a similar configuration, which is slightly different from that of the inner projection 41 because the intermediate projection 43 has the magnetic head 261. Detailed descriptions of the outer projection 42 and the intermediate projection 43 will be omitted.

The first step part 411 and the second step part 412 of the inner projection 41 are separated by a wall along a straight boundary line 414 that extends from the inner side toward the outer side and is slanted toward the air inlet side.

Figure 3:
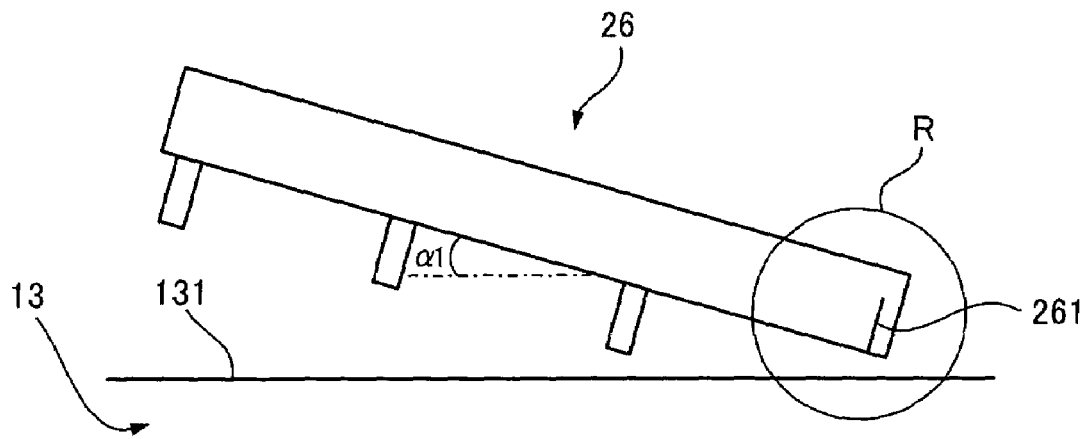
FIG. 3 shows the conventional magnetic head slider shown in FIG. 2 floating over a magnetic disk.
Figure 4:
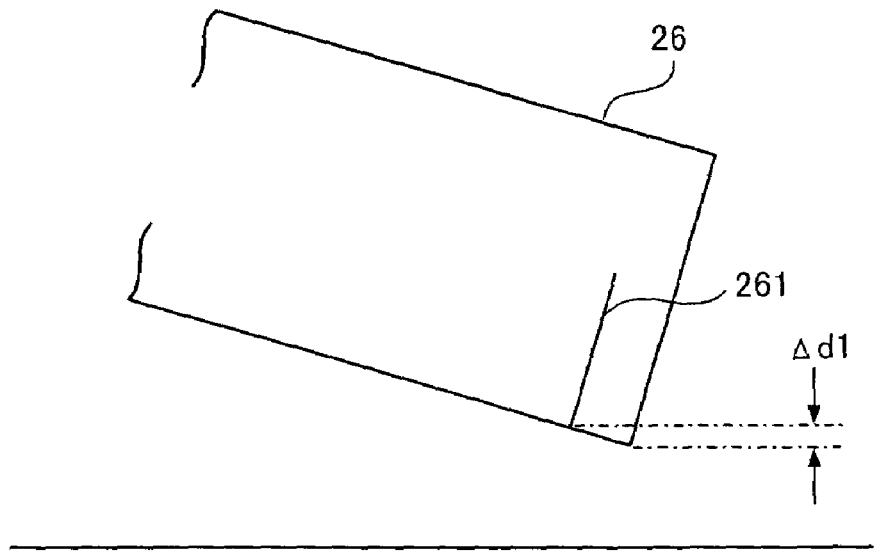
FIG. 4 is a partially enlarged view of a part of the magnetic head slider in the circle R shown in FIG. 3.

FIG. 3 shows the conventional magnetic head slider shown in FIG. 2 floating over the magnetic disk, and FIG. 4 is a partially enlarged view of a part in the circle R shown in FIG. 3.

When the magnetic disk 13 is rotating, the magnetic head slider 26 floats over the surface 131 of the magnetic disk 13 in a state where the magnetic head slider is inclined at a predetermined pitch angle (elevation angle) α1 with respect to the air inlet side. In this floating state, the magnetic head 261 fixed to the magnetic head slider 26 accesses the magnetic disk 13. In this case, a difference Δd1 between the height of the magnetic head 261 and the height of the lowest part of the magnetic head slider 26 shown in FIG. 4 becomes a problem. In order to allow the slider to float at a lower height, the difference Δd1 has to be stably reduced.

Now, the slider according to an embodiment will be described.

Figure 5:
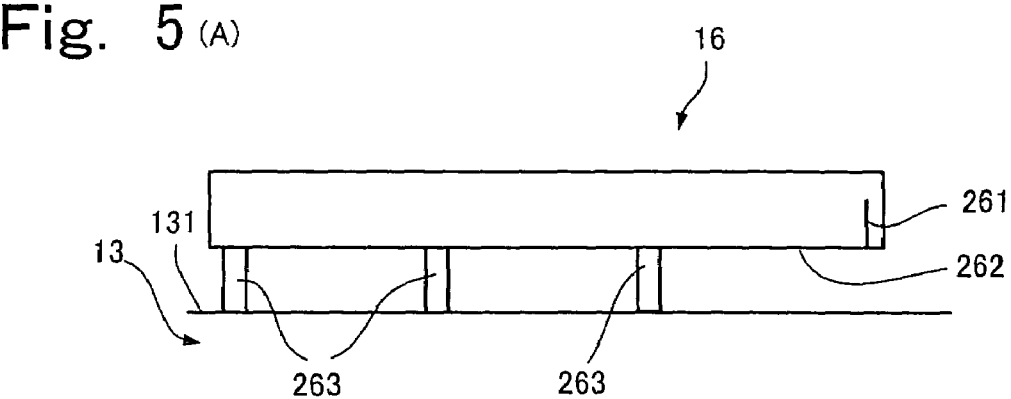
FIG. 5 shows a magnetic head slider according to an embodiment of the present invention.
Figure 5:
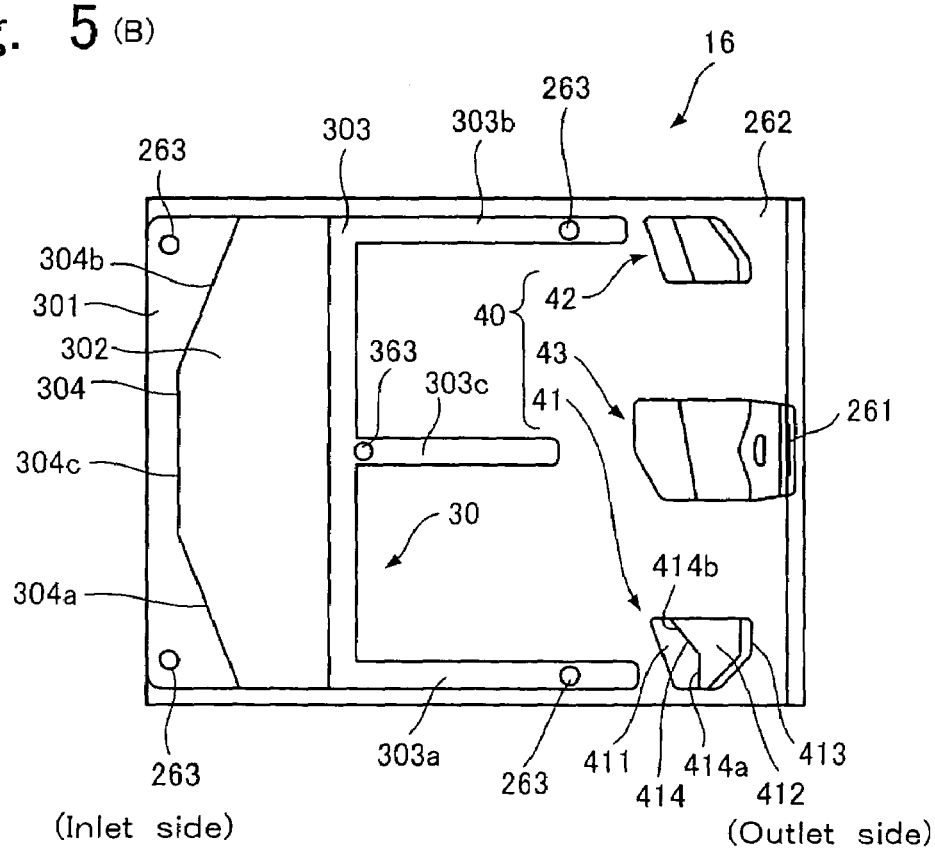

FIG. 5 shows a magnetic head slider according to an embodiment of the present invention: FIG. 5(A) is a side view thereof; and FIG. 5(B) shows a floating surface thereof.

The components of the magnetic head slider 16 shown in FIG. 5 corresponding to those of the conventional magnetic head slider 26 shown in FIG. 2 are assigned the same reference numerals as in FIG. 2, and only the differences between the magnetic head slider 16 and the conventional magnetic head slider 26 shown in FIG. 2 will be described herein.

In the case of the magnetic head slider 16 shown in FIG. 5, a first step part 411 and a second step part 412 of an inner projection 41 of second projections 40 on an air outlet side formed on a floating surface 262 are separated by a wall along a boundary line 414 formed by a first segment 414a extending from the inner side toward the outer side and a second segment 414b that extends from the outer-side end of the first segment 414a toward the outer side and is slanted toward the air inlet side. Since the wall along such a bent boundary line 414 is formed, the variation in roll angle (that is, inclination in the direction from the inner side to the outer side) between a normal rotation period and a low-speed rotation period can be reduced, and the slider can float stably during the low-speed rotation period.

Besides, a first step part 301 and a second step part 302 of a first projection 30 on an air inlet side of the magnetic head slider 16 shown in FIG. 5 are separated by a wall along a boundary line 304. The boundary line 304 is a line that connects the inner side and the outer side and is bent so that an intermediate section 304c thereof between an inner section 304a and an outer section 304b is closer to the air inlet side than the inner section 304a and the outer section 304b. Since this wall is shaped in this way, the variation in pitch angle α2 (see FIG. 8) between a normal condition (at an altitude of 0 m) and a high altitude condition can be reduced. In this embodiment, this also enables the slider to float at a lower height.

Furthermore, while the third step 303 of the first projection 30 of the magnetic head slider 26 shown in FIG. 2 has two tails 303a and 303b, a third step of the first projection 30 of the magnetic head slider 16 shown in FIG. 5 has, in addition to an inner rail 303a and an outer rail 303b, a rail 303c formed between the inner rail 303a and the outer rail 303b.

Figure 6:
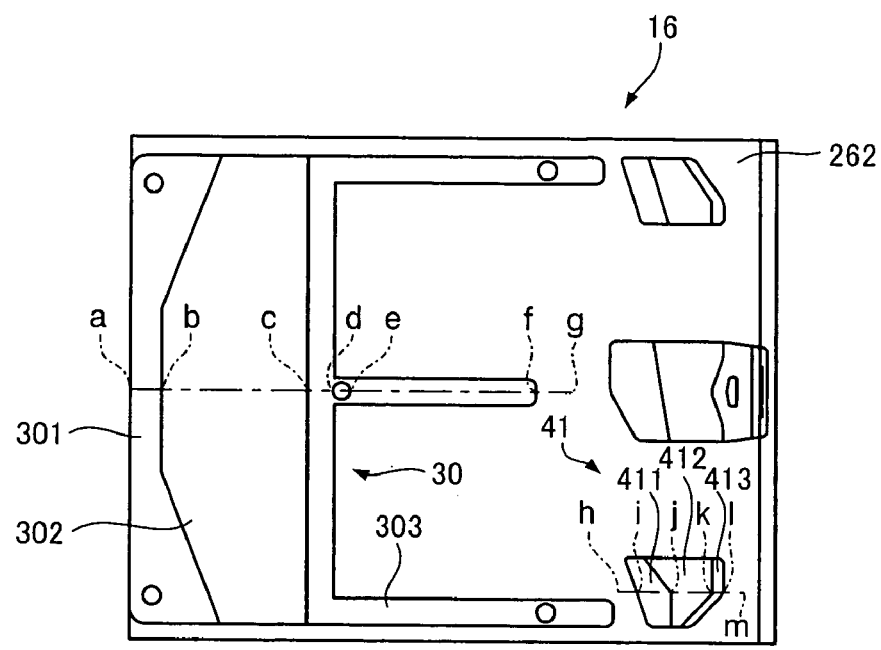
FIG. 6 shows a floating surface according to the same embodiment as that shown in FIG. 5 with an alternate long and short dash line for taking a cross section additionally shown.
Figure 7:
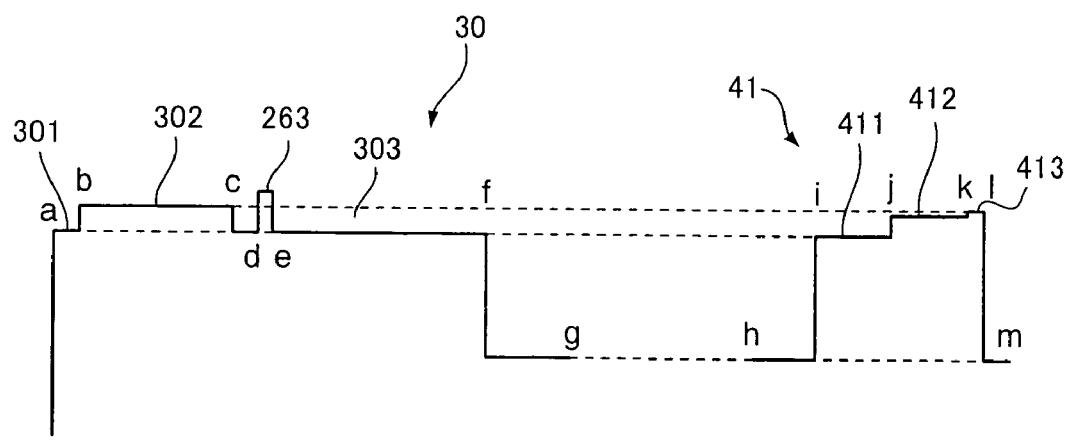
FIG. 7 is a cross-sectional view taken along the alternate long and short dash line shown in FIG. 6.

FIG. 6 shows the floating surface according to the embodiment shown in FIG. 5 with an alternate long and short dash line for taking a cross section additionally shown, and FIG. 7 is a cross-sectional view taken along the alternate long and short dash line shown in FIG. 6.

As shown in FIG. 7, the first projection 30 on the air inlet side has the first step part 301 on the air inlet side, the second step part 302 adjacent to the first step part on the air outlet side and having a height greater than that of the first step part 301, and the third step 303 adjacent to the second step part 302 on the air outlet side and having the same height as the first step part 301.

The inner projection 41 of the second projections 40 on the air outlet side (see FIG. 5) has the first step part 411 on the air inlet side, the second step part 412 adjacent to the first step part 411 on the air outlet side and having a height greater than that of the first step part 411, and the third step 413 adjacent to the second step part on the air outlet side and having a height still greater than that of the second step part 412.

Figure 8:
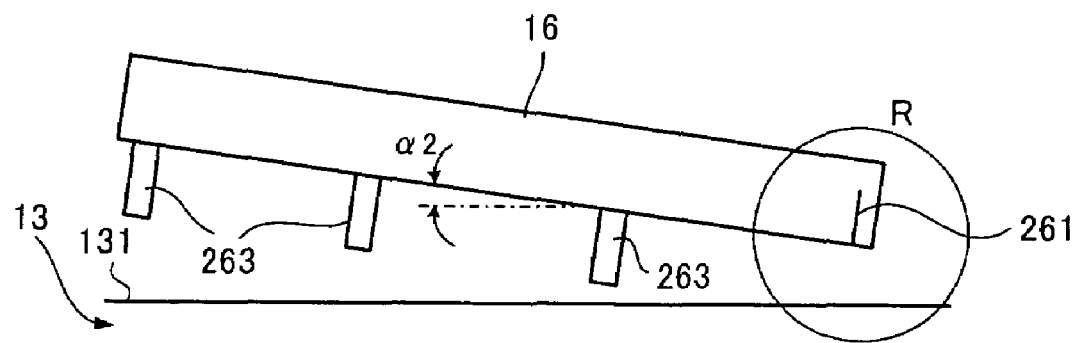
FIG. 8 shows the magnetic head slider according to this embodiment shown in FIG. 5 floating over a magnetic disk.
Figure 9:
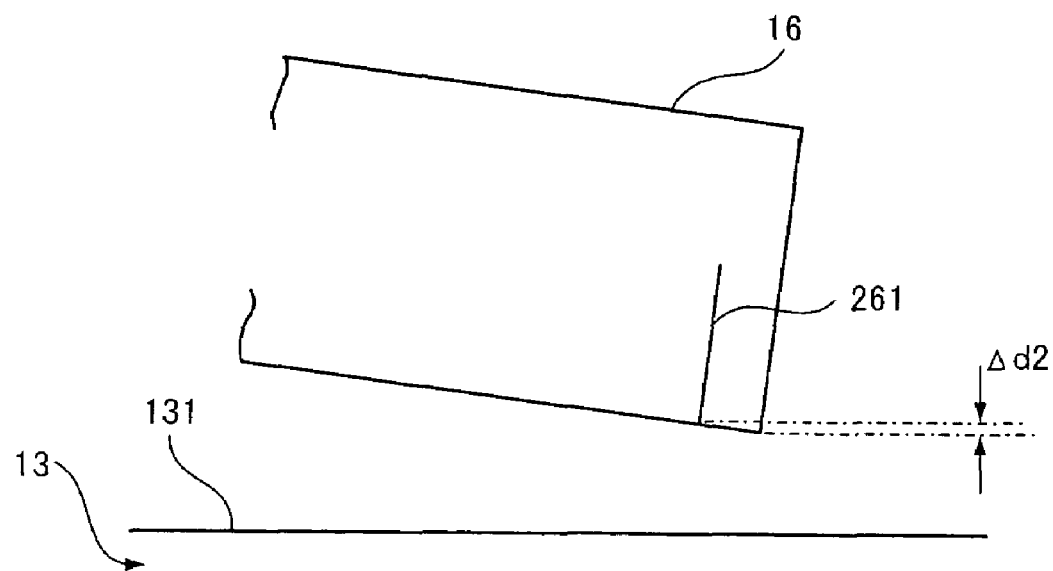
FIG. 9 is a partially enlarged view of a part of the magnetic head slider in the circle R shown in FIG. 8.

FIG. 8 shows the magnetic head slider according to this embodiment shown in FIG. 5 floating over the magnetic disk, and FIG. 9 is a partially enlarged view of a part in the circle R shown in FIG. 8.

When the magnetic disk 13 is rotating, the magnetic head slider 16 floats over the surface 131 of the magnetic disk 13 in a state where the magnetic head slider is inclined at a predetermined pitch angle (elevation angle) α2 with respect to the air inlet side. The pitch angle α2 is smaller than the pitch angle α1 of the conventional magnetic head slider 26 during floating shown in FIG. 3, and thus, as shown in FIG. 9, the difference Δd2 between the height of the magnetic head 261 and the height of the lowest part of the magnetic head slider 16 is also reduced.

Figure 10:
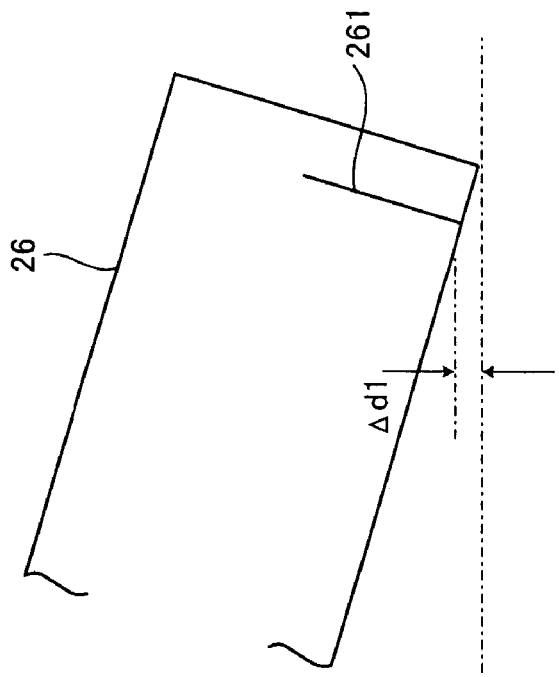
FIG. 10 is an enlarged view of the part of the magnetic head of the magnetic head slider according to this embodiment and the part of the magnetic head of the conventional magnetic head slider at the time when the magnetic head sliders are floating.
Figure 10:
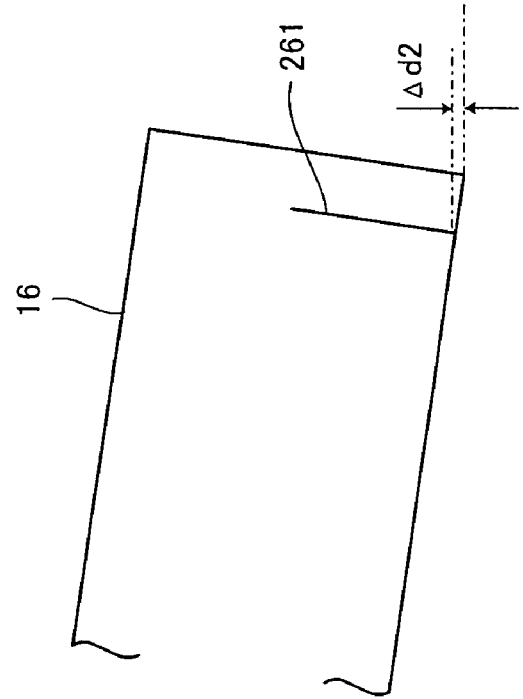

FIG. 10 is an enlarged view of the part of the magnetic head 261 of the magnetic head slider 16 according to this embodiment shown in FIG. 5 and the part of the magnetic head 261 of the conventional magnetic head slider 26 shown in FIG. 2 at the time when the magnetic head sliders are floating. FIG. 10 corresponds to a side-by-side combination of FIG. 9 showing the magnetic head slider according to this embodiment and FIG. 4 showing the conventional magnetic head slider.

As shown in FIG. 10, the difference Δd2 during floating in this embodiment is smaller than the difference Δd1 during floating in the conventional example. In this embodiment, this small difference Δd2 can be achieved by reducing the variation in pitch angle and the variation in roll angle by the mechanism described above. Thus, the magnetic head slider 16 is less inclined during floating and can float at a lower height accordingly.

In the following, a simulation result according to this embodiment will be described.

Figure 11:
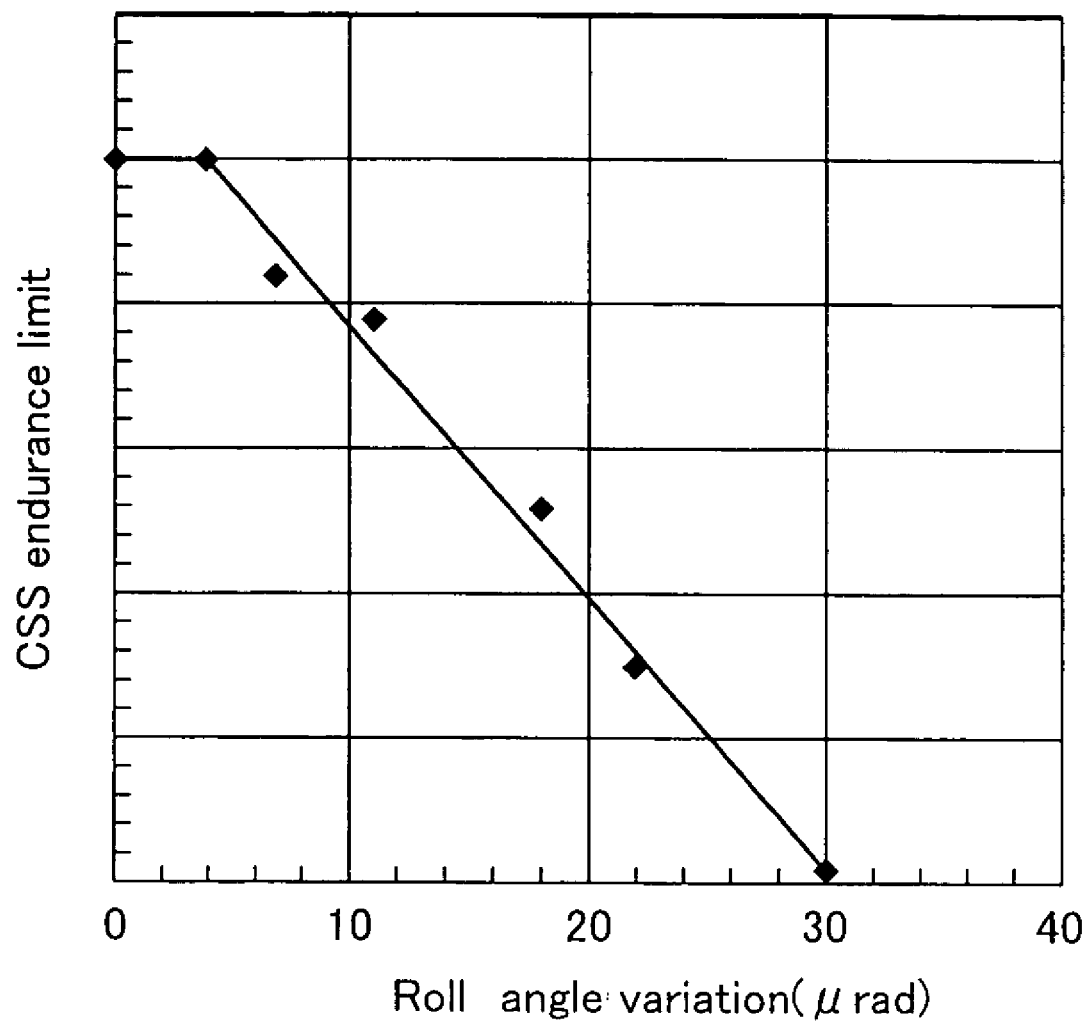
FIG. 11 is a graph of the CSS endurance limit with respect to the roll angle variation.

FIG. 11 is a graph of the CSS endurance limit with respect to the roll angle variation.

In FIG. 11, the horizontal axis indicates the variation in roll angle at the CSS zone for the case where the magnetic disk 13 is decelerated from a normal rotation state (10000 rpm, here) to a low-speed rotation state (3000 rpm, here) (this is referred to as a condition 1, hereinafter), and the vertical axis indicates the CSS endurance limit (that is, the number of starts/stops until the magnetic head becomes unable to normally access the magnetic disk).

From FIG. 11, it can be seen that the magnetic head can be kept in a stable floating posture if the variation in roll angle is reduced to 4 μrads or smaller.

Figure 12:
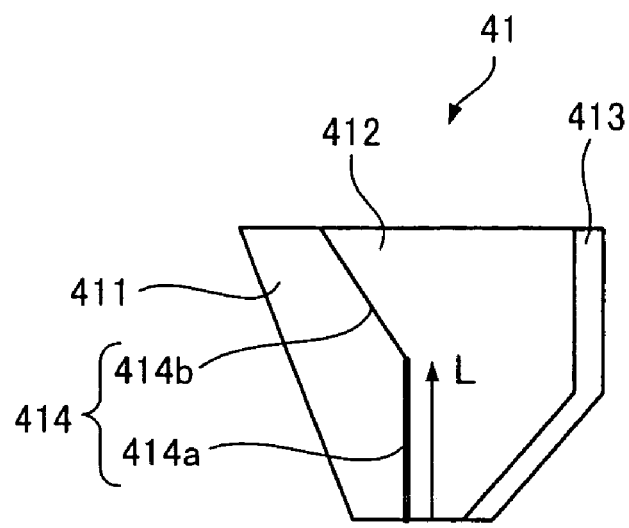
FIG. 12 is a diagram showing an inner projection for simulation.
Figure 13:
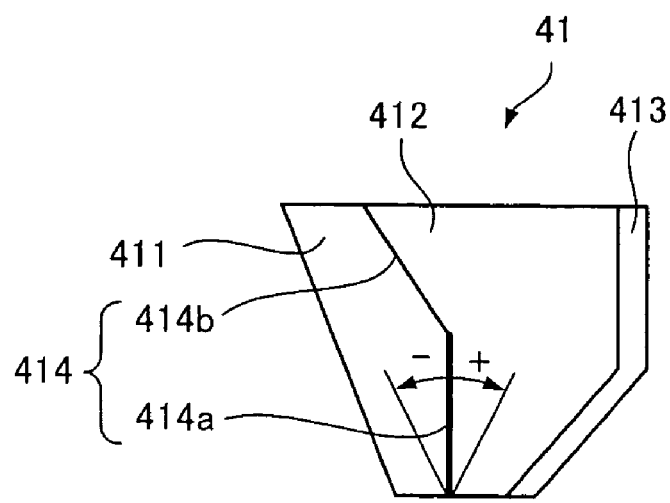
FIG. 13 is a diagram showing an inner projection for simulation.

FIGS. 12 and 13 are diagrams showing the inner projection 41 (see FIG. 5) for simulation described below.

As described above, the first step part 411 and the second step part 412 of the inner projection 41 are separated by the wall along the boundary line 414, which is formed by the first segment 414a extending from the inner side toward the outer side and the second segment 414b extending from the outer-side end of the first segment 414a toward the outer side and slanted toward the air inlet side. Here, FIG. 12 shows a change of the length L of the first segment 414a, and FIG. 13 shows a change of the slant of the first segment 414a.

Figure 14:
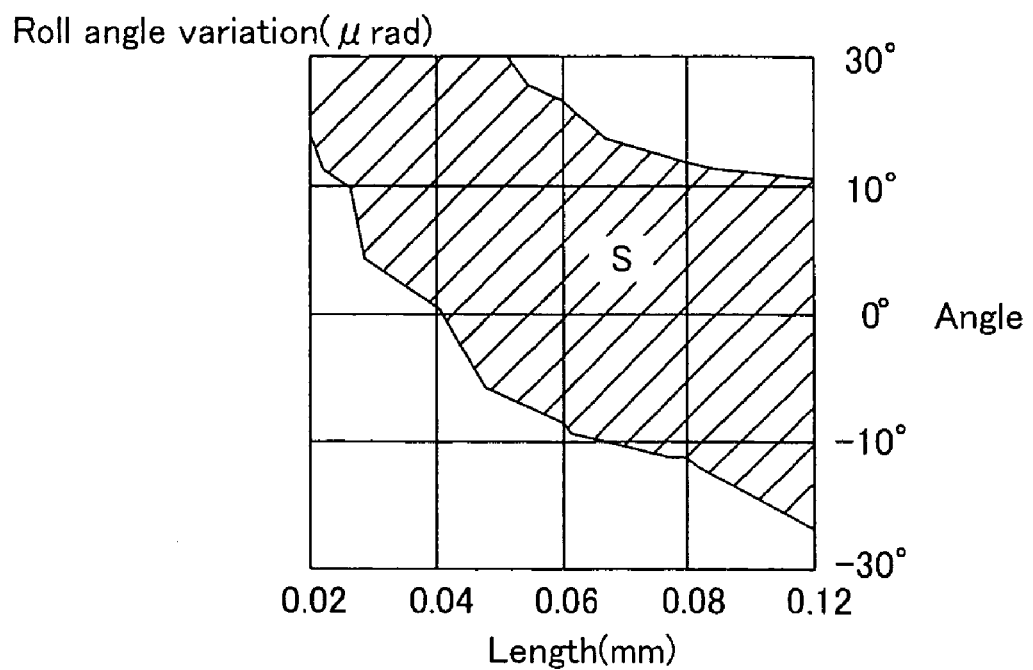
FIG. 14 shows a simulation result showing correspondences of the length of a first segment (on the horizontal axis) and the slant of the first segment (on the vertical axis) illustrated in FIGS. 12 and 13, respectively, with the variation in roll angle.

FIG. 14 shows a simulation result showing correspondences of the length of the first segment (on the horizontal axis) and the slant of the first segment (on the vertical axis) illustrated in FIGS. 12 and 13, respectively, with the variation in roll angle.

Within the shaded region S surrounded by two polygonal lines, the variation in roll angle under the condition 1 described above is ±4 μrads or smaller, and if the magnetic head slider is fabricated by optimally adjusting the length and angle of the first segment 414a, the variation in roll angle can be suppressed to an adequate level.

Figure 15:
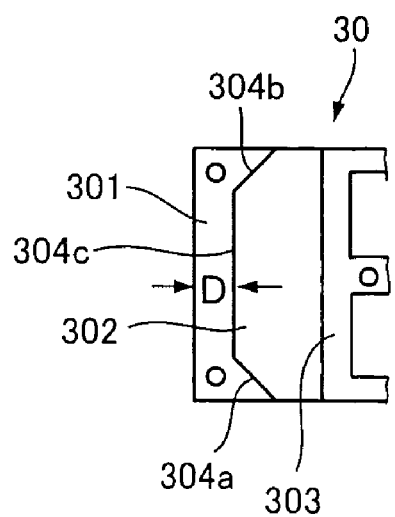
FIG. 15 shows a first projection 30 (see FIG. 5) on an air inlet side for another simulation.

FIG. 15 shows the first projection 30 (see FIG. 5) on the air inlet side for another simulation.

As described above, the wall separating the first step part 301 on the air inlet side of the first projection 30 from the second step part 302 adjacent to the first step part 301 has the intermediate section 304c closer to the air inlet side than the inner section 304a and the outer section 304b. Now, a simulation result of the effect of a change of the distance D from the end of the first projection 30 on the air inlet side to the second step part 302 will be described.

Figure 16:
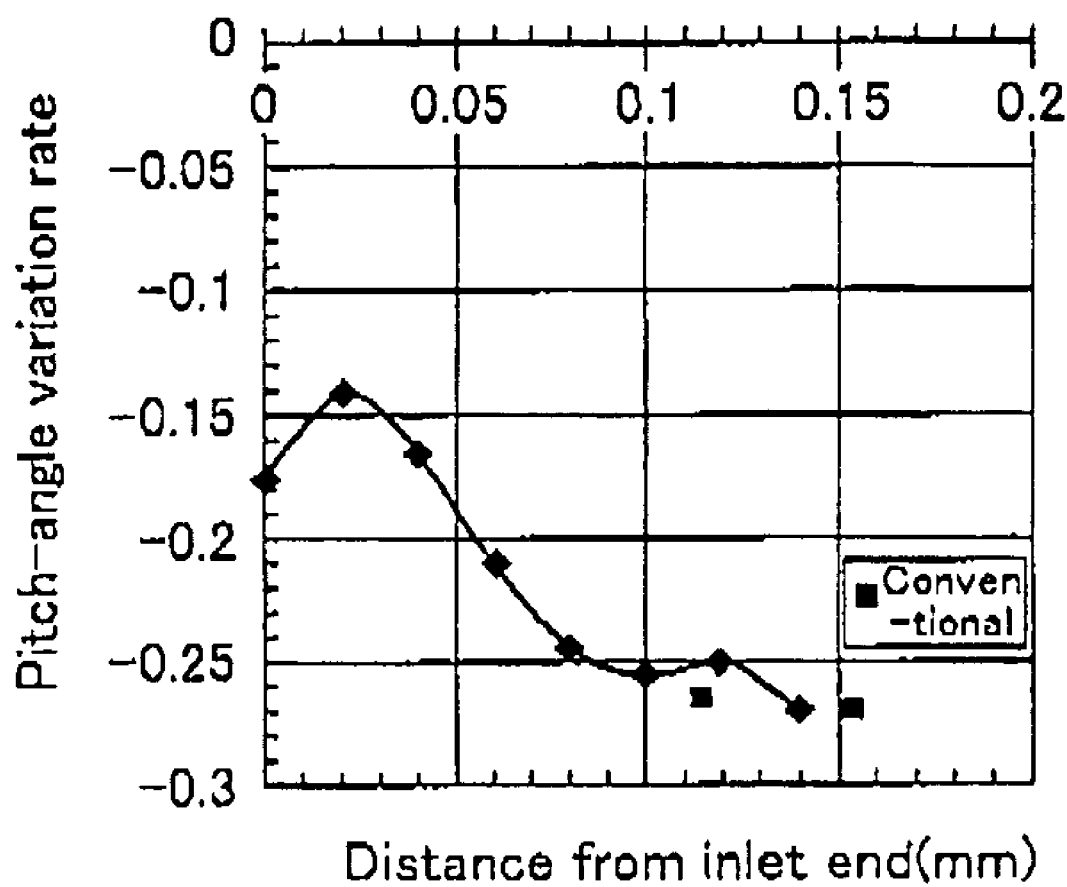
FIG. 16 is a graph showing the variation in pitch angle for the case where the distance D shown in FIG. 15 is changed.

FIG. 16 is a graph showing the variation in pitch angle for the case where the distance D shown in FIG. 15 is changed.

The horizontal axis in FIG. 16 indicates the distance D shown in FIG. 15, and the vertical axis in FIG. 16 indicates the pitch-angle variation rate which is calculated by dividing the pitch angle variation from the pitch angle under a normal condition (at an altitude of 0 m) to the pitch angle under a high altitude condition (at an altitude of 5000 m) by the pitch angle under the normal condition.

In addition, FIG. 16 shows the results of similar simulation for two conventional examples (see FIG. 2).

From FIG. 16, it can be seen that, when the distance D from the air inlet end (see FIG. 15) is equal to or less than 0.063 mm, a 20% or more improvement of the pitch-angle variation rate can be achieved over the conventional examples.

If the pitch angle variation is reduced, the pitch angle under the normal condition (that is, the pitch angle $\alpha 2$ shown in FIG. 8) can be reduced. If the pitch angle $\alpha 2$ is reduced, the height of the floating magnetic head 261 can be reduced (see FIG. 9), and thus, the magnetic head can float at a lower height.

For simplicity, the present invention has been described assuming that the magnetic disk device accesses only one surface of only one magnetic disk 13. However, the present invention can be applied to a magnetic disk device that accesses the both surfaces of a magnetic disk, and a magnetic disk device that rotates plural magnetic disks arranged concentrically and accesses the plural magnetic disks.

Furthermore, the magnetic disk device has been described herein. However, the present invention is not applied exclusively to the magnetic disk device, but can be applied to a disk device that accesses another disk-like storage medium, such as an optical disk and a magneto-optical disk.

What is claimed is:

1. A disk device that rotates a disk-like storage medium and accesses the storage medium, comprising:

a slider that has an element for accessing the storage medium fixed thereto, floats over the storage medium by the action of an airflow caused by rotation of the storage medium and allows the element to access the storage medium, wherein the slider has a first rail located on an air inlet side and a second rail located on an air outlet side, the second rail on the air outlet side including an inner rail located on an inner side of the storage medium and an outer rail located on an outer side of the storage medium, and the inner rail has a first step part located on the air inlet side and a second step part located adjacent to the first step part on the air outlet side and having a height greater than that of the first step part, the first step part and the second step part being separated by a wall along a first segment extending from the inner side toward the outer side and a second segment extending from the outer-side end of the first segment toward the outer side with being slanted toward the air inlet side.

2. The disk device according to claim 1, wherein the first rail has a first step part located on the air inlet side and a second step part located adjacent to the first step part on the air outlet side and having a height greater than that of the first step part, and the first step part and the second step part are separated by a wall along a boundary line connecting the inner side and the outer side and having an inner section, an outer section and an intermediate section between the inner section and the outer section that is located closer to the air inlet side than the inner section and the outer section.

3. The disk device according to claim 1, wherein the first rail has three rails including an inner rail, an outer rail and an intermediate rail between the inner rail and the outer rail, which are located on the air outlet side of the second step part thereof and extend toward the air outlet side.

4. The disk device according to claim 1, wherein the storage medium is a magnetic disk.

5. The disk device according to claim 1, wherein the slider is a CSS-type slider, which is in contact with the storage medium when the storage medium is at rest.

6. The disk device according to claim 1, wherein an intermediate rail to which the element is fixed is provided between the inner rail and the outer rail.

7. A slider that has an element for accessing a rotating disk-like storage medium fixed thereto, floats over the storage medium by the action of an airflow caused by rotation of the storage medium and allows the element to access the storage medium, comprising:
a first rail located on an air inlet side and a second rail located on an air outlet side, the second rail on the air outlet side including an inner rail located on an inner side of the storage medium and an outer rail located on an outer side of the storage medium,
wherein the inner rail has a first step part located on the air inlet side and a second step part located adjacent to the first step part on the air outlet side and having a height greater than that of the first step part, the first step part and the second step part being separated by a wall along a first segment extending from the inner side toward the outer side and a second segment extending from the outer-side end of the first segment toward the outer side with being slanted toward the air inlet side.

8. The slider according to claim 7, wherein the first rail has a first step part located on the air inlet side and a second step part located adjacent to the first step part on the air outlet side and having a height greater than that of the first step part, and the first step part and the second step part are separated by a wall along a boundary line connecting the inner side and the outer side and having an inner section, an outer section and an intermediate section between the inner section and the outer section that is located closer to the air inlet side than the inner section and the outer section.

9. The slider according to claim 7, wherein the first rail has three rails including an inner rail, an outer rail and an intermediate rail between the inner rail and the outer rail, which are located on the air outlet side of the second step part thereof and extend toward the air outlet side.

10. The slider according to claim 7, wherein the storage medium is a magnetic disk.

11. The slider according to claim 7, wherein the slider is a CSS-type slider, which is in contact with the storage medium when the storage medium is at rest.

12. The slider according to claim 7, wherein an intermediate rail to which the element is fixed is provided between the inner rail and the outer rail.

* * * * *